United States Patent
Ryu (10) Patent No.: US 9,875,356 B2
(45) Date of Patent: Jan. 23, 2018

(54) SYSTEM FOR PREVENTING MALICIOUS INTRUSION BASED ON SMART DEVICE AND METHOD THEREOF

(71) Applicant: MWSTORY Co., Ltd., Seoul (KR)

(72) Inventor: Dae Gull Ryu, Seoul (KR)

(73) Assignee: MWSTORY CO., LTD., Seoul (KR)

( * ) Notice: Subject to any disclaimer, the term of this patent is extended or adjusted under 35 U.S.C. 154(b) by 152 days.

(21) Appl. No.: 14/779,573

(22) PCT Filed: Feb. 11, 2014

(86) PCT No.: PCT/KR2014/001100
§ 371 (c)(1),
(2) Date: Sep. 24, 2015

(87) PCT Pub. No.: WO2014/157826
PCT Pub. Date: Oct. 2, 2014

(65) Prior Publication Data
US 2016/0055336 A1  Feb. 25, 2016

(30) Foreign Application Priority Data

Mar. 28, 2013 (KR) ........................ 10-2013-0033792

(51) Int. Cl.
G06F 21/56 (2013.01)
G06F 21/55 (2013.01)

(52) U.S. Cl.
CPC .............. G06F 21/56 (2013.01); G06F 21/55 (2013.01); G06F 21/562 (2013.01); *G06F 2221/033* (2013.01)

(58) Field of Classification Search
CPC ........ G06F 21/55; G06F 21/56; G06F 21/562; G06F 2221/033
See application file for complete search history.

(56) References Cited

U.S. PATENT DOCUMENTS

2002/0169983 A1* 11/2002 Rygaard ................. G06F 21/55
                                                                726/4
2004/0177270 A1*  9/2004 Little ...................... G06F 21/62
                                                                713/166

(Continued)

FOREIGN PATENT DOCUMENTS

JP          2010-182196        8/2010
KR          10-1048439         7/2011

(Continued)

OTHER PUBLICATIONS

Gilbert et al., "Automating Privacy Testing of Smartphone Applications", Retrieved From https://users.cs.duke.edu/~lpcox/TR-CS-2011-02.pdf, Published Feb. 2011.*

*Primary Examiner* — Chau Le
(74) *Attorney, Agent, or Firm* — Lex IP Meister, PLLC (57) ABSTRACT

The present invention provides a system and a method of preventing intrusion of a malicious code based on a smart device.

The system for preventing intrusion of a malicious code based on a smart device includes: a collection unit that collects at least one situation information allowing for recognition of situation of the smart device; a control unit that primarily determines whether to execute an application on the basis of the collected situation information and secondarily determines whether to execute the application on the basis of a hash value extracted from a portion of or the entire file relating to execution of the application; and a display unit that displays an image for executing the application on the basis of the result of determination, in which the control unit checks whether the application performs a function of a predetermined malicious code on the basis of (Continued)

the collected situation information and primarily determines whether to execute the application on the basis of the result of checking.

12 Claims, 7 Drawing Sheets

(56) References Cited

U.S. PATENT DOCUMENTS

| | | | | |
|---|---|---|---|---|
| 2005/0114658 A1* | 5/2005 | Dye | ........................ | G06F 21/55 713/165 |
| 2009/0210702 A1* | 8/2009 | Welingkar | .............. | H04L 9/321 713/156 |
| 2010/0011446 A1* | 1/2010 | Klucher | .................. | G06F 21/10 726/27 |
| 2011/0119736 A1* | 5/2011 | Maeng | .................... | G06F 21/55 726/3 |
| 2012/0090033 A1* | 4/2012 | Kelly | ...................... | G06F 21/34 726/26 |
| 2013/0078949 A1* | 3/2013 | Pecen | ................... | H04L 63/101 455/411 |
| 2013/0166899 A1* | 6/2013 | Courtney | ................ | G06F 21/53 713/100 |
| 2013/0212684 A1* | 8/2013 | Li | ..................... | G06F 17/30522 726/25 |
| 2014/0308919 A1* | 10/2014 | Baranov | ............... | H04W 12/10 455/410 |

FOREIGN PATENT DOCUMENTS

| | | |
|---|---|---|
| KR | 10-2012-0136126 | 12/2012 |
| KR | 10-1246623 | 3/2013 |
| KR | 10-2013-0050865 | 5/2013 |
| KR | 10-2013-0117728 | 10/2013 |

* cited by examiner

SYSTEM FOR PREVENTING MALICIOUS INTRUSION BASED ON SMART DEVICE AND METHOD THEREOF

TECHNICAL FIELD

The present invention relates to a method of preventing intrusion of a malicious code, particularly, a system for preventing intrusion of a malicious code based on a smart device by primarily determining whether to execute an application on the basis of situation information collected to recognize the situation of a smart device and by secondarily determining whether the execute an application on the basis of a hash value extracted from a file relating to execution of the application, and a method thereof.

BACKGROUND ART

Damage due to malicious code infection of smartphones has increased with a rapid increase of smartphone users. Various security solutions are provided against smartphone malicious codes, but they are solutions for companies or large-scale enterprises, so common users cannot easily use them.

MDM (Mobile Device Management) products provide various functions such as wireless terminal management, access management, and application management, but most of the products provide basic services yet in terms of completion and they are slowly developed. Further, as an access method using an anti-virus, there is an attempt to reduce damage due to infection with smartphone malicious codes by distributing free antivirus applications from communication service providers.

However, most antivirus providers take measures on the basis of analysis on malicious codes that have been widespread already, so it is difficult to block malicious codes that have not been known yet.

Further, android phones can easily download and install applications from not only personal application markets, but web browsers, so it is especially difficult to block malicious codes. Therefore, it is required to take a countermeasure against malicious codes that users can easily use.

DISCLOSURE

Technical Problem

The present invention has been made in an effort to solve the problems and an object of the present invention is to provide a system for preventing intrusion of a malicious code based on a smart device by primarily determining whether to execute an application on the basis of situation information collected to recognize the situation of a smart device and by secondarily determining whether the execute an application on the basis of a hash value extracted from a file relating to execution of the application, and a method of preventing intrusion of a malicious code.

Another object of the present invention is to provide a method of preventing intrusion of a malicious code based on a smart device by primarily determining whether to execute an application on the basis of situation information collected to recognize the situation of a smart device and by secondarily determining whether the execute an application on the basis of a hash value extracted from a file relating to execution of the application, and a method of preventing intrusion of a malicious code.

However, the objects of the present invention are not limited to those stated above and other objects not stated above may be clear to those skilled in the art from the following description.

Technical Solution

In order to achieve the objects, a smart device according to an aspect of the present invention includes: a collection unit that collects at least one situation information allowing for recognition of situation of the smart device; a control unit that primarily determines whether to execute an application on the basis of the collected situation information and secondarily determines whether to execute the application on the basis of a hash value extracted from a portion of or the entire file relating to execution of the application; and a display unit that displays an image for executing the application on the basis of the result of determination, in which the control unit checks whether the application performs a function of a predetermined malicious code on the basis of the collected situation information and primarily determines whether to execute the application on the basis of the result of checking.

Preferably, the situation information includes at least one of GPS information, movement propensity information, network situation information, device information, battery consumption amount information, application information, network traffic use amount information by each application, call time information, and sensor information.

Preferably, the control unit extracts a hash value of a portion of or the entire file relating to execution of the application, obtains a hash value by checking a predetermined electronic signature value with a predetermined public key of a server, and secondarily determines whether to execute the application on the basis of a result of comparing the extracted hash value with the obtained hash value.

Preferably, the predetermined electronic signature value is a signature value created as a result of extracting a hash value of a portion of or the entire file relating to execution of the application and of applying electronic signature to the extracted hash value with a predetermined private key.

Preferably, the obtained hash value is obtained from hash value=HASH (random data+hash value of file to be executed+current time), in which the random data is randomly created data and the current time is the time when the hash file is created.

Preferably, the control unit, when a desired application is selected, checks the selected application is in a predetermined white list including applications permissible to be executed, and when the selected application is in the white list, the control unit primarily determines whether there is a problem with the selected application on the basis of the collected situation information.

A method of preventing intrusion of a malicious code based on a smart device according to another aspect of the present invention includes: collecting at least one situation information allowing for recognition of situation of the smart device; primarily determining whether to execute an application on the basis of the collected situation information and secondarily determining whether to execute the application on the basis of a hash value extracted from a portion of or the entire file relating to execution of the application; and displaying an image for executing the application on the basis of the result of the determination, in which the determining is to check whether the application performs a function of a predetermined malicious code on the basis of the collected situation information and to primarily determine whether to execute the application on the basis of the result of checking.

Preferably, the situation information includes at least one of GPS information, movement propensity information, network situation information, device information, battery consumption amount information, application information, network traffic use amount information by each application, call time information, and sensor information.

Preferably, the determining is to extract a hash value of a portion of or the entire file relating to execution of the application, to obtain a hash value by checking a predetermined electronic signature value with a predetermined public key of a server, and to secondarily determine whether to execute the application on the basis of a result of comparing the extracted hash value with the obtained hash value.

Preferably, the predetermined electronic signature value is a signature value created as a result of extracting a hash value of a portion of or the entire file relating to execution of the application and of applying electronic signature to the extracted hash value with a predetermined private key.

Preferably, the obtained hash value is obtained from hash value=HASH (random data+hash value of file to be executed+current time), in which the random data is randomly created data and the current time is the time when the hash file is created.

Preferably, the determining, when a desired application is selected, is to check the selected application is in a predetermined white list including applications permissible to be executed, and when the selected application is in the white list, the determining is to primarily determine whether there is a problem with the selected application on the basis of the collected situation information.

Advantageous Effects

Therefore, it is possible to detect intrusion of a malicious code and prevent execution of the malicious code by primarily determining whether to execute an application on the basis of situation information collected to recognize the situation of a smart device and by secondarily determining whether the execute an application on the basis of a hash value extracted from a file relating to execution of the application.

Further, it is possible to prevent leakage of individual information from a smart device by determining whether to execute an application on the basis of situation information of a smart device and a hash value of a file relating to execution of the application, and by detecting intrusion of a malicious code and preventing execution of the application on the basis of the result of the determination.

Further, it is possible to prevent leakage of business secret information from a smart device by determining whether to execute an application on the basis of situation information of a smart device and a hash value of a file relating to the execution of application, and by detecting intrusion of a malicious code and preventing execution of the application on the basis of the result of the determination.

[Description of Main Reference Numerals of Drawings]

| | |
|---|---|
| 100: Smart device | 200: Management server |
| 300: Database | |

BEST MODE

Hereinafter, system and method of preventing intrusion of a malicious code based on a smart device according to exemplary embodiments of the present invention will be described with reference to FIGS. 1 to 8. Those for understanding the operation and the work according to the present invention will be mainly described in detail.

Further, in descriptions of components of the present invention, different reference numerals may be used for the components having same names, depending on drawings and the same reference numerals may be used for components even in different drawings. However, even in this case, it does not mean that the corresponding components have different functions according to the embodiments or it means that the corresponding components have the same function in different embodiments and the functions of each component will be determined based on the description of each component in the corresponding embodiments.

In particular, the present invention proposes a method of preventing intrusion of a malicious code based on a smart device that detects intrusion of a malicious code into a smart device and prevents execution of an application by primarily determining whether to execute an application on the basis of situation information collected to recognize the situation of a smart device and by secondarily determining whether the execute an application on the basis of a hash value extracted from a file relating to execution of the application.

Figure 1:
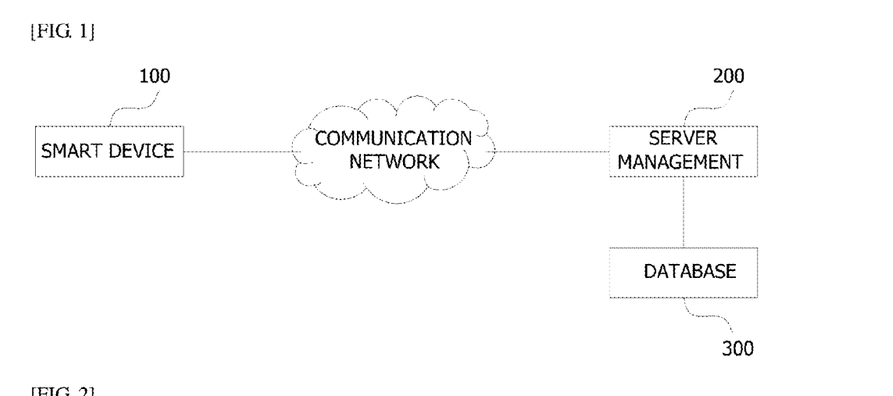
FIG. 1 is a diagram illustrating a system for preventing intrusion of a malicious code according to an embodiment of the present invention.

FIG. 1 is a diagram illustrating a system for preventing intrusion of a malicious code according to an embodiment of the present invention.

As illustrated in FIG. 1, a system for preventing intrusion of a malicious code according to the present invention includes a smart device 100 a management server 200, and a database 300 etc.

The smart device 100 primarily determines whether to execute an application on the basis of situation information collected to recognize its situation and secondarily determines whether to execute the application on the basis of a hash value extracted from a file relating to execution of the application, and then it can execute the application on the basis of the determination.

That is, the smart device 100 determines whether there is a problem with an application on the basis of the collected situation information and determines whether there is a problem with the application on the basis of the extracted hash value. Herein, the smart device 100 described herein may be a conception including devices allowing users to use mobile communication services, for example, a smartphone, a tablet PC, a notebook, and the like.

The management server 200 can make and manage a white list and a black list of applications in cooperation with the smart device 100.

1) The white list means a list of permissible applications that are permitted to be executed by users of a smart device or security systems.

A plurality of white lists may be provided in accordance with the object or use, for example, the white lists may be classified into a white list for a company, a white list for home, and the like.

2) The black list means a list of non-permissible applications that are refused to be executed by users of a smart device or security systems.

For example, applications classified into a black list may include an application that is executed with another execution, an application that is executed when an event occurs, and application that is periodically repeated at predetermined times, an application that is executed in the middle of night, an application that is executed with a monitor off, an application that consumes a battery over a predetermined level, an application that uses a memory over a predetermined level, and application that generates a network traffic over a predetermined level, an application that causes rooting, an application that accesses a folder keeping personal information and business secret information (a folder keeping messages and call data), an application that has different hash values of files relating to execution of the application from those that have been kept when the application was initially installed or updated.

A plurality of black lists may be provided in accordance with the object or use, for example, the black lists may be classified into a black list for a company and a black list for home.

A plan for executing application may be constructed on the basis of the white lists or the black lists. For example, a plan for executing an application includes 1) permitting only application in a white list, 2) permitting only applications that is matched with specific situations, even if they are in a white list, 3) permitting applications in a black list only when a user permits them to be executed, 4) refusing all of the applications in a black list, and 5) refusing all applications. The data base 300 can keep and manage white lists and black lists.

Figure 2:
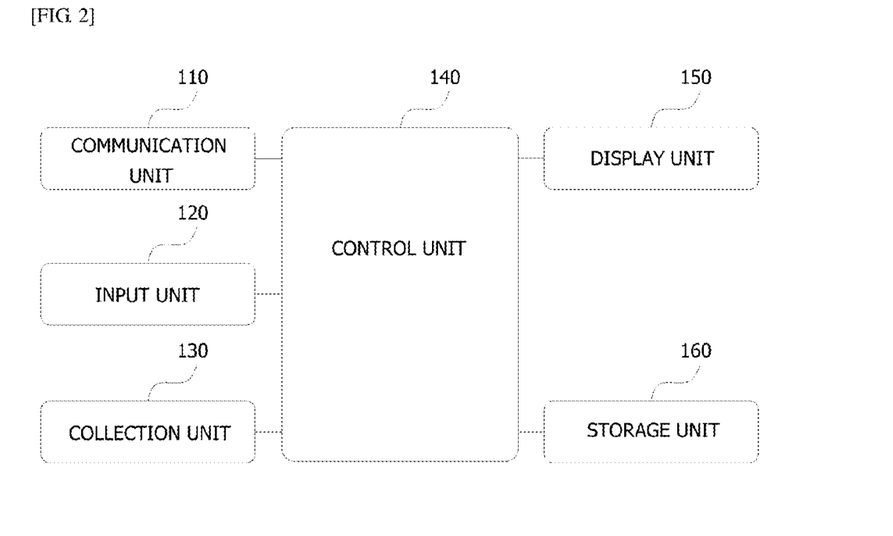
FIG. 2 is a diagram illustrating a detailed configuration of a smart device according to an embodiment of the present invention.

FIG. 2 is a diagram illustrating a detailed configuration of a smart device according to an embodiment of the present invention.

As illustrated in FIG. 2, the smart device 100 according to the present invention may include a communication unit 110, an input unit 120, a collection unit 130, a control unit 140, a display unit 150, and a storage unit 160.

The communication unit 110 can transmit/receive various data in cooperation with a management server through wireless communication. For example, the communication unit 110 receives a white list and a black list from a management server.

The input unit 120 can receive information on operations of a menu or keys from a user.

The collection unit 130 can collect situation information allowing for recognition of the situation of a smart device. For example, the situation information may include: GPS information about an area around a company, an area around home, a dangerous area, and the like; movement propensity information about stop, walking, running, and the like; time information about work time, non-work time, specific time, and the like; network situation information about network state such as WiFi or 3G, WiFi reception intensity, 3G reception intensity, network use amount in WiFi, network use amount in 3G, binding information about each of network interfaces, and the like; device information about whether or not of rooting, Locale information, and the like; battery consumption amount information about a change in battery consumption amount, the total battery consumption amount after turning-on, and the like; application information about memory use amount by each application, network traffic use amount by each application, start time and end time of applications, versions of application, and the like; network traffic use information about each application; call time information about sending call time, receiving call time, and the like; and sensor information about a measured gyroscope value, a rotation value, an acceleration value, a linear acceleration value, a direction, a brightness value, a noise value, and the like.

The control unit 140 can primarily determine whether to execute an application on the basis of collected situation information and then secondarily determine whether to execute the application on the basis of a hash value extracted from a file relating to execution of the application. Further, the control unit 140 may permit or refuse execution of the application in accordance with the determination results.

For example, when the control unit 140 primarily determines that there is no problem with an application and then secondarily determines that there is no problem with the application, it can execute the application.

The display unit 150 can display an image for setting whether to execute an application and whether to execute a predetermined application.

The storage unit 160 can keep and manage white lists and black lists.

Figure 3:
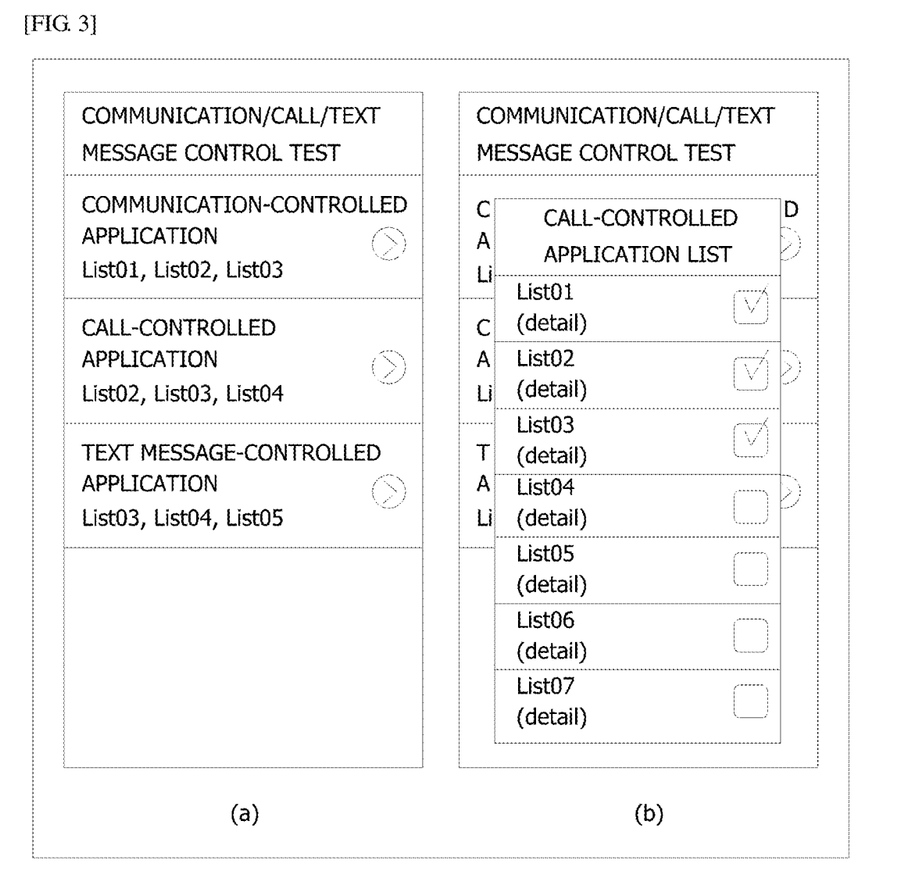
FIG. 3 is a diagram illustrating a setting image of an application according to an embodiment of the present invention.

FIG. 3 is a diagram illustrating a setting image of an application according to an embodiment of the present invention.

(a) of FIG. 3 illustrates a setting image of various application, in which the applications may be classified, for example, into communication-controlled applications, call-controlled application, text message-controlled application, and the like.

Referring to (b) of FIG. 3, when a call-controlled application is selected, an application list is displayed so that an application to be controlled can be selected from the displayed application list.

Call through the selected application, that is, communication or a text message can be controlled.

Figure 4:
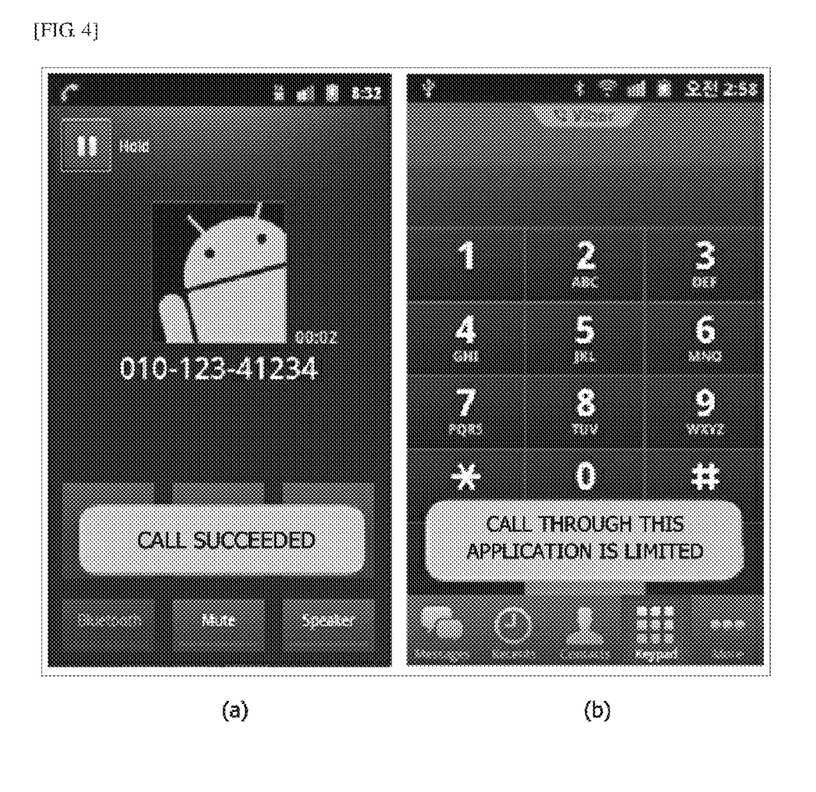
FIG. 4 is a first diagram illustrating a control image of an application according to an embodiment of the present invention.
Figure 5:
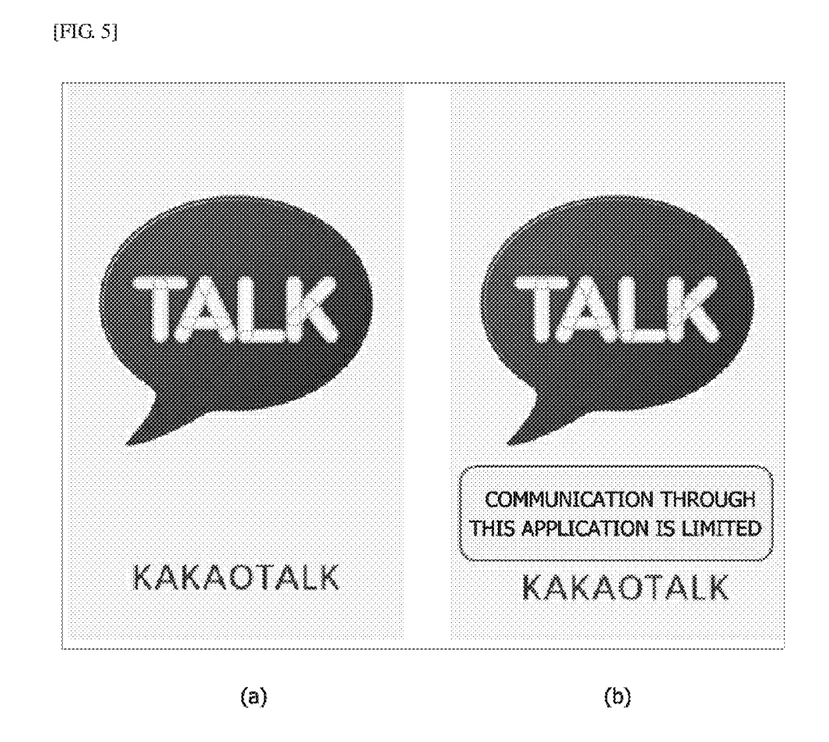
FIG. 5 is a second diagram illustrating a control image of an application according to an embodiment of the present invention.

FIG. 4 is a first diagram illustrating a control image of an application according to an embodiment of the present invention, and FIG. 5 is a second diagrams illustrating a control image of an application according to an embodiment of the present invention.

Referring to FIG. 4 illustrating call control images based on setting of a call-controlled application, (a) illustrates an execution image for a non-controlled application and (b) illustrates an execution image for a controlled application.

That is, when a controlled application is executed, a message relating to a predetermined call limit is outputted through a pop-up and an actual call through the application is blocked.

Referring to FIG. 5 illustrating communication control images based on setting of a communication-controlled application, (a) illustrates an execution image for a non-controlled application and (b) illustrates an execution image for a controlled application.

That is, when a controlled application is executed, a message relating to a predetermined communication limit is outputted through a pop-up and an actual communication through the application is blocked.

Figure 6:
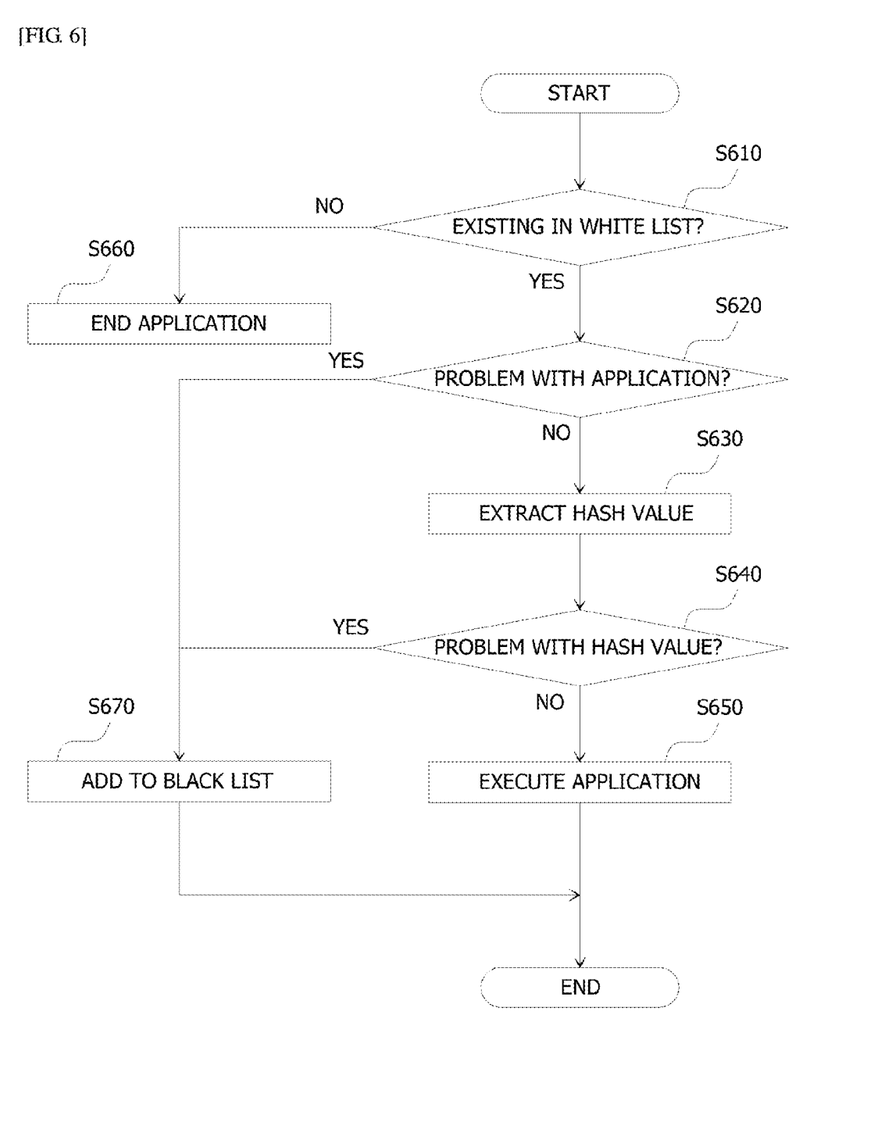
FIG. 6 is a diagram illustrating a method of preventing intrusion of a malicious code according to an embodiment of the present invention.

FIG. 6 is a diagram illustrating a method of preventing intrusion of a malicious code according to an embodiment of the present invention.

As illustrated in FIG. 6, when a user selects a desired application through a menu or keys, a smart device according to the present invention can check whether the selected application is in a white list that has been stored before (S610).

Next, when the application is in the white list, the smart device can primarily determine whether there is a problem with the selected application on the basis of situation information that has been collected before (S620). That is, the smart device determines whether the selected application performs a specific function, that is, performs a function of a malicious code on the basis of the collected situation information.

In contrast, when the selected application is not in the white list, the smart device refuses execution of the application and informs a user of this determination result.

Next, when the smart device primarily determines that there is no problem with the selected application, it extracts the hash value of a file relating to execution of the application (S630) and can secondarily determine whether there is a problem with the selected application on the basis of the extracted hash value and a hash value that has been stored before (S640).

In contrast, when the smart device primarily determines that there is a problem with the selected application, it refuses execution of the application and adds the application to a black list.

Next, when the smart device secondarily determines that there is no problem with the selected application, it determines that the application is not an object to be controlled and then can execute the application (S650).

In contrast, when the smart device secondarily determines that there is a problem with the selected application, it refuses execution of the application and adds the application to a black list.

Figure 7:
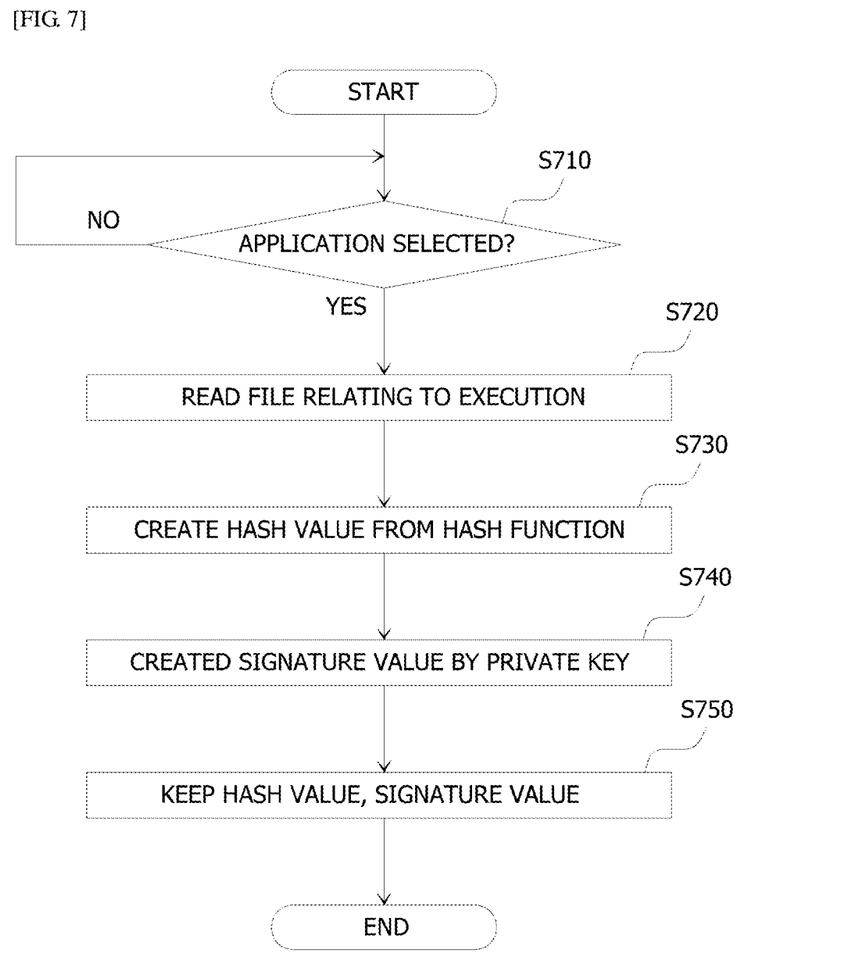
FIG. 7 is a diagram illustrating a process of setting a hash value according to an exemplary embodiment of the present invention.

FIG. 7 is a diagram illustrating a process of setting a hash value according to an exemplary embodiment of the present invention.

As illustrated in FIG. 7, when a user selects a desired application through a menu or keys (S710), a smart device according to the present invention can read a file relating to execution of the selected application (S720).

Next, the smart device can apply a predetermined cryptologic hash function to a portion of the read file or the entire read file and create a hash value on the basis of the applying result (S730).

Such a hash value can be obtained from the function in [Equation 1].

$$\text{Hash value} = \text{HASH (random data + hash value of file to be executed + current time)} \quad [\text{Equation 1}]$$

Herein, the random data is randomly created data and the current time is the time when the hash file was created.

Next, the smart device can encode the created hash value with a predetermined private key or apply an electronic signature to the hash value and create a signature value as the result of electronic signature (S740). Herein, the smart device receives and uses a private key designated from a management server. In this case, when the electronic signature value is transmitted to the smart device, data of the transmission terminal is secured by session key type of encoding communication or SSL communication.

Next, the smart device can keep the created hash value and the signature value (S750). In this case, the smart device keeps the created hash value and the signature value in itself and a management server.

In this case, the smart device keeps an application ID, an application name, random data, a hash value, a signature value, a registration date, or the current time when the hash file was created.

The management server keeps a smart device ID, an application ID, an application name, random data, a hash value, a signature value, a registration date, or the current time when the hash file was created.

Figure 8:
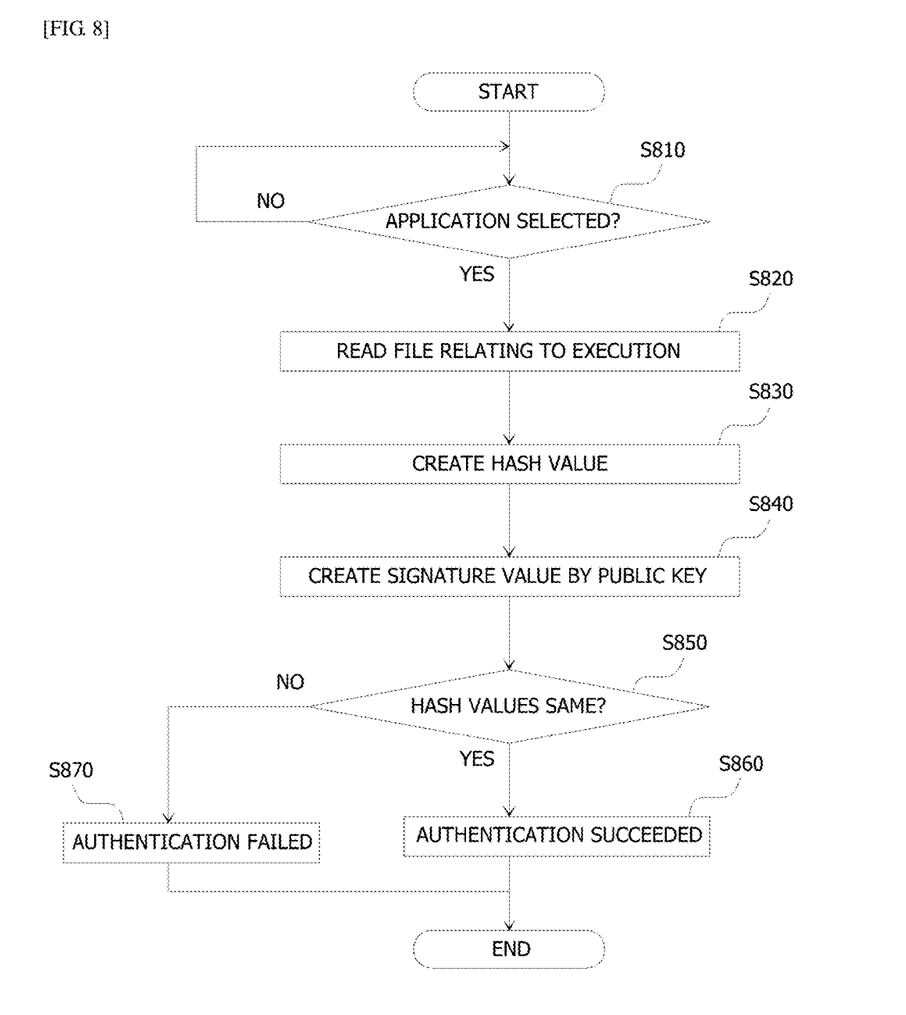
FIG. 8 is a diagram illustrating a process of checking a hash value according to an exemplary embodiment of the present invention.

FIG. 8 is a diagram illustrating a process of checking a hash value according to an exemplary embodiment of the present invention.

As illustrated in FIG. 8, when a user selects a desired application through a menu or keys (S810), a smart device according to the present invention can read a file relating to execution of the selected application (S820).

Next, the smart device can apply a preset cryptologic hash function to a portion of the read file or the entire read file and create a hash value on the basis of the applying result (S830).

Next, the smart device can decode the electronic signature value kept therein with a predetermined public key or check the electronic signature and obtain a hash value from the result of checking the electronic signature (S840). Herein, the smart device receives and uses a public key designated from a management server.

Next, the smart device can compare the hash value obtained by checking the electronic signature with the created hash value (S850). That is, when the hash values are same, as result of the comparison, the smart device determines that authentication was succeeded and there is no problem with the application (S860).

In the present invention, the reason of not every time extracting a hash value of a portion of or the entire file relating to execution of an application, applying an electronic signature to the extracted hash value with a private key of a predetermined server, and comparing the electronic signature value with an electronic signature value kept in a smart device is because a traffic is generated by connection with a server every time an electronic signature is applied. Accordingly, in the present invention, an electronic signature of a hash value is checked with a pre-designated public key (a hash is decoded) and then hash values are compared.

On the contrary, when the hash values are not same, as result of the comparison, the smart device determines that authentication was failed and there is a problem with the application (S870).

Meanwhile, embodiments of the present invention can be constructed as programs that can be executed in a computer and can be implemented in common digital computers that execute the programs using a computer-readable recording medium. The computer-readable recording medium includes a storage device such as a magnetic storage device (for example, a ROM, a floppy disk, a hard disk, and the like), an optical-readable medium (for example, a CD ROM, a DVD, and the like).

It should be understood that the embodiments described above are just examples and the present invention may be changed and modified by those skilled in the art without departing from the scope of the present invention. Accordingly, the embodiment described herein are provided not to limit, but to explain the spirit of the present invention and the spirit and the scope of the present invention are not limited by the embodiments. The protective range of the present disclosure should be construed on the basis of claims and all the technical spirits in the equivalent range should be construed as being included in the scope of the right of the present disclosure.

The invention claimed is:

1. A smart device comprising:
a processor configured to:
collect at least one situation information allowing for recognition of situation of the smart device,
primarily determines whether to execute an application on the basis of the collected situation information, and
in a case that the application is primarily determined to be executable, secondarily determine whether to execute the application on the basis of a hash value extracted from a portion of or the entire file relating to execution of the application;
in a case that the application is primarily or secondarily determined not to be executable, refuse execution of the application and add the application to a black list; and
a display that displays an image for executing the application, when there is no problem with the results of both of the primary determination and the secondary determination,
wherein the processor checks whether the application performs a function of a predetermined malicious code on the basis of the collected situation information and primarily determines whether to execute the application on the basis of the result of checking.

2. The smart device of claim 1, wherein the situation information includes at least one of GPS information, movement propensity information, network situation information, device information, battery consumption amount information, application information, network traffic use amount information by each application, call time information, and sensor information.

3. The smart device of claim 1, wherein the processor extracts a hash value of a portion of or the entire file relating to execution of the application,
obtains a hash value by checking a predetermined electronic signature value with a predetermined public key of a server, and
secondarily determines whether to execute the application on the basis of a result of comparing the extracted hash value with the obtained hash value.

4. The smart device of claim 3, wherein the predetermined electronic signature value is a signature value created as a result of extracting a hash value of a portion of or the entire file relating to execution of the application and of applying electronic signature to the extracted hash value with a predetermined private key.

5. The smart device of claim 3, wherein the obtained hash value is obtained from hash value =HASH (random data +hash value of file to be executed +current time), in which the random data is randomly created data and the current time is the time when a hash file was created.

6. The smart device of claim 1, wherein the processor, when a desired application is selected, checks the selected application is in a predetermined white list including applications permissible to be executed, and
when the selected application is in the white list, the control processor primarily determines whether there is a problem with the selected application on the basis of the collected situation information.

7. A method of preventing intrusion of a malicious code based on a smart device, the method comprising:
collecting at least one situation information allowing for recognition of situation of the smart device;
primarily determining whether to execute an application on the basis of the collected situation information;
in a case that the application is primarily determined to be executable, secondarily determining whether to execute the application on the basis of a hash value extracted from a portion of or the entire file relating to execution of the application;
in a case that the application is primarily or secondarily determined not to be executable, refusing execution of the application and adding the application to a black list; and
displaying an image for executing the application, when there is no problem with the results of both of the primary determination and the secondary determination,
wherein the determining is to check whether the application performs a function of a predetermined malicious code on the basis of the collected situation information and to primarily determine whether to execute the application on the basis of the result of checking.

8. The method of claim 7, wherein the situation information includes at least one of GPS information, movement propensity information, network situation information, device information, battery consumption amount information, application information, network traffic use amount information by each application, call time information, and sensor information.

9. The method of claim 7, wherein the determining is to extract a hash value of a portion of or the entire file relating to execution of the application,
to obtain a hash value by checking a predetermined electronic signature value with a predetermined public key of a server, and
to secondarily determine whether to execute the application on the basis of a result of comparing the extracted hash value with the obtained hash value.

10. The method of claim 9, wherein the predetermined electronic signature value is a signature value created as a result of extracting a hash value of a portion of or the entire file relating to execution of the application and of applying electronic signature to the extracted hash value with a predetermined private key.

11. The method of claim 9, wherein the obtained hash value is obtained from hash value =HASH (random data +hash value of file to be executed +current time), in which the random data is randomly created data and the current time is the time when a hash file is created.

12. The method of claim 7, wherein the determining, when a desired application is selected, is to check the selected application is in a predetermined white list including applications permissible to be executed, and
when the selected application is in the white list, the determining is to primarily determine whether there is a problem with the selected application on the basis of the collected situation information.

* * * * *